United States Patent [19]

Stein et al.

[11] Patent Number: 5,345,721
[45] Date of Patent: Sep. 13, 1994

[54] HOOK AND PIN FASTENER ASSEMBLY FOR A DOOR TRIM PANEL

[75] Inventors: Arthur C. Stein, Grosse Ile; Loten T. Baskin, West Bloomfield, both of Mich.

[73] Assignee: General Motors Corporation, Detroit, Mich.

[21] Appl. No.: 60,193

[22] Filed: May 7, 1993

[51] Int. Cl.⁵ ............................................. B60J 5/04
[52] U.S. Cl. ................................. 49/502; 296/146.7
[58] Field of Search ...................... 49/502; 296/146.7

[56] References Cited

U.S. PATENT DOCUMENTS 5,040,335  8/1991  Grimes .................................. 49/502
5,111,619  5/1992  Billin et al. ............................ 49/502

Primary Examiner—Philip C. Kannan
Attorney, Agent, or Firm—Todd L. Moore; Ernest E. Helms

[57] ABSTRACT

A hook and pin fastener assembly for connecting and reliably locating a molded door trim panel to an apertured inner door panel of a motor vehicle without the need for conventional fasteners. A pair of conventional hooks are molded into the upper and lower portions of a molded door trim panel, and a locator pin is molded into a center portion of the molded door trim panel. The pair of hooks extend through corresponding apertures in the inner door panel and slidably engage the inner door panel so that movement of the upper and lower portions of the molded door trim panel is restricted in the lateral direction. The locator pin has a main body and a free end, wherein the free end is integral with and extending from the main body. The free end is slightly smaller than a locating aperture in the inner door panel, and the main body is larger than the locating aperture. The free end of the locator pin extends through the locating aperture to locate and restrict movement of the molded door trim panel in the vertical and fore and aft directions. The main body of the locator pin engages the inner door panel and is interposed between the molded door trim panel and the inner door panel to locate and prevent movement of the molded door trim panel in the lateral direction 3 Claims, 2 Drawing Sheets

HOOK AND PIN FASTENER ASSEMBLY FOR A DOOR TRIM PANEL

The present invention relates to vehicle door trim panels and more particularly to a hook and pin fastener assembly that connects and reliably locates a molded door trim panel to an inner door panel of a motor vehicle without the need for conventional fasteners.

BACKGROUND OF THE INVENTION

It is well known to use hooks, screws, barbed fasteners and a combination thereof for connecting a molded door trim panel to an inner door panel of a motor vehicle. Such fastener systems do not provide multi-dimensional adjustment for location, and therefore, reliably locating the molded door trim panel to the inner door panel is difficult.

It would be desirable to provide a new and improved hook and pin fastener assembly that both connects and reliably locates a molded door trim panel to an inner door panel without the need for conventional fasteners.

SUMMARY OF THE INVENTION

The present invention provides a hook and pin fastener assembly that both connects and reliably locates a molded door trim panel to an inner door panel of a motor vehicle without the need for conventional fasteners. The hook and pin fastener assembly provides for lateral, vertical and fore and aft location of the molded door trim panel to the inner door panel as well as providing a snap-on assembly that does not require the need for conventional fasteners.

The hook and pin fastener assembly comprises a locator pin molded into a center portion of the molded door trim panel, and a pair of conventional hooks molded into an upper portion and a lower portion of the molded door trim panel. The pair of hooks extend through corresponding apertures in the inner door panel and slidably-engage the inner door panel to restrict movement of the upper and lower portions of the molded door trim panel in the lateral direction. The corresponding apertures are large enough to provide for limited travel of the hooks and the molded door trim panel in the vertical and fore and aft directions.

The locator pin has a main body and a free end, wherein the free end is integral with and extending from the main body. The main body is larger than a locating aperture provided in the inner door panel, and the free end is slightly smaller than the locating aperture. The locating aperture is a reference or origin by which the molded door trim panel is located relative to the inner door panel. The free end of the locator pin extends through the locating aperture to restrict movement of and locate the molded door trim panel in the vertical and fore and aft directions. The main body of the locator pin has a shoulder that engages the inner door panel to restrict movement of and locate the molded door trim panel in the lateral direction.

The molded door trim panel is assembled to the inner door panel by inserting the lower portion hook of the molded door trim panel through its corresponding aperture in the inner door panel while the molded door trim panel is oriented at an acute angle relative to the inner door panel. The molded door trim panel is then pivoted upwards towards the inner door panel until both hooks are extending through the upper and middle portions of their corresponding apertures. The free end of the locator pin engages the inner door panel slightly above the locating aperture so that the free end is not extending through the locating aperture. The limited travel of the hooks provided in their corresponding apertures allows the molded door trim panel to move vertically downward and fore and aft until the free end of the locator pin extends through the locating aperture to provide a snap-on assembly. The center portion of the molded door trim panel is flexed away from the inner door panel by the main body of the locator pin interposing between the inner door panel and the molded door trim panel. The biasing of the molded door trim panel towards its natural free state position maintains engagement of the shoulder of the main body of the locator pin against the inner door panel as well as keeping the free end of the locator pin extended through the locating aperture of the inner door panel.

Thus, the object of the present invention is to provide a new and improved hook and pin fastener assembly that both connects and reliably locates a molded door trim panel to an apertured inner door panel of a vehicle without the need for conventional fasteners.

DESCRIPTION OF THE PREFERRED EMBODIMENTS

Figures 1, 3:
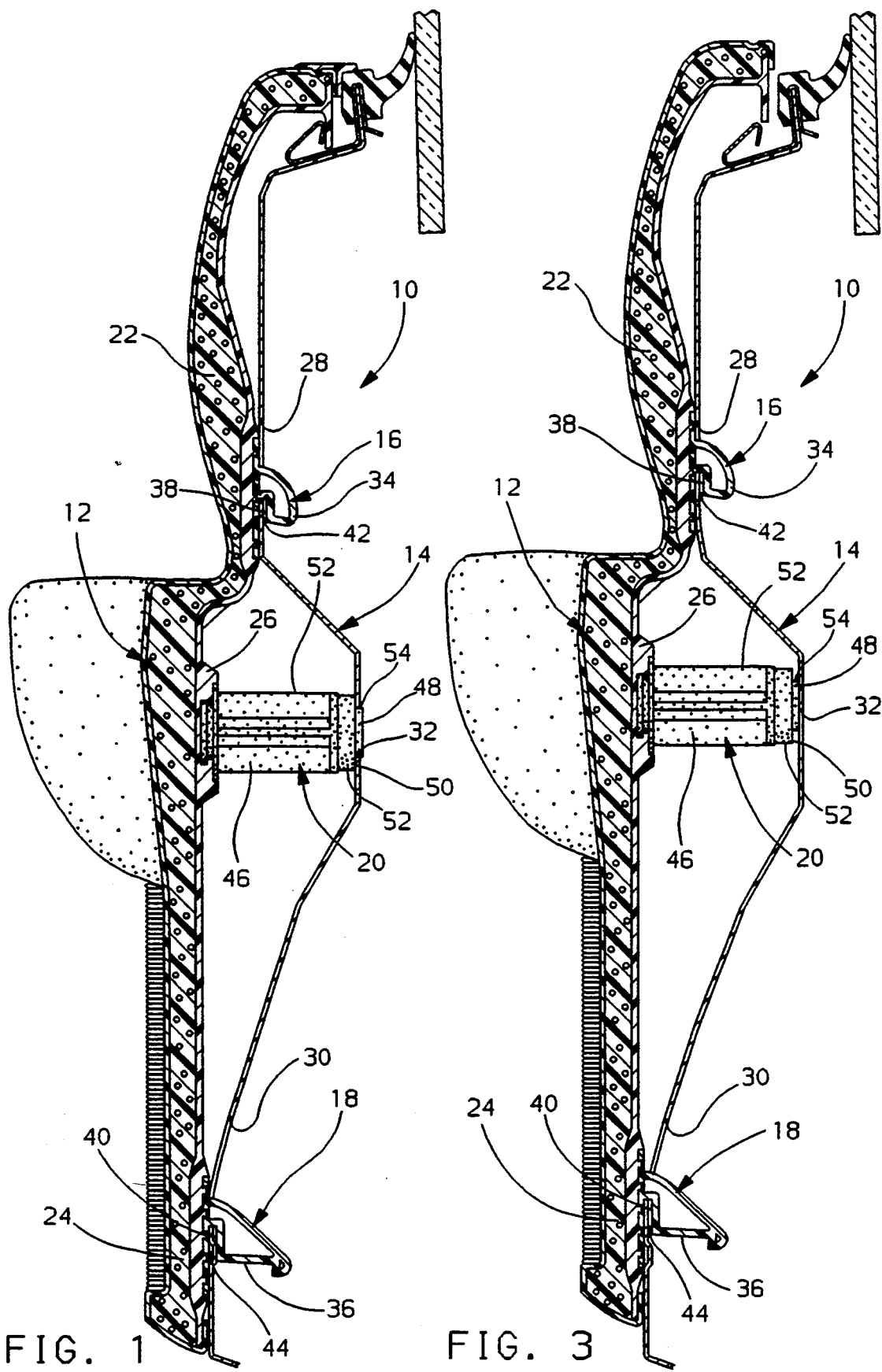
FIG. 1 is a side elevation view showing the hook and pin fastener assembly connecting and locating the molded door trim panel to the inner door panel of a vehicle.
FIG. 3 is a side elevation view showing the molded door trim panel in the second assembly position, wherein the hooks occupy the upper portion of their corresponding apertures to provide the molded door trim panel with an upward position wherein the locator pin engages the inner door panel and does not extend through the locating aperture in the inner door panel.

Referring to the drawings, the present invention will now be described in detail with reference to the preferred embodiments.

FIG. 1 shows a hook and pin fastener assembly 10 connecting and reliably locating a molded door trim panel 12 to an inner door panel 14 of a motor vehicle (not shown). The hook and pin fastener assembly 10 comprises a pair of conventional hooks 16,18 and a locator pin 20 molded into the molded door trim panel 12. One of the hooks 16 is molded into an upper portion 22 of the molded door trim panel 12, and the other hook 18 is molded into a lower portion 24 of the molded door trim panel 12. The locator pin 20 is molded into a center portion 26 of the molded door trim panel 12. The hooks 16,18 extend through corresponding apertures 28,30 in the inner door panel 14 to slidably engage and secure the inner door panel 14 to the molded door trim panel 12. The locator pin 20 extends through a locating aperture 32 in the inner door panel 14 to reliably locate and restrict movement of the molded door trim panel 12 in the lateral, vertical and fore and aft directions. The locating aperture 32 is an origin or reference by which the molded door trim panel 12 is located relative to the inner door panel 14.

The pair of hooks 16,18 each provide a downwardly angled finger 34,36, respectively, that has a surface 38,40, respectively, substantially parallel to the molded door trim panel 12. Openings 42,44, respectively, are provided between the substantially parallel surfaces 38,40 and the molded door trim panel 12 that are slightly larger than the thickness of the inner door panel 14. The hooks 16,18 slidably engage the inner door panel 14 by having the inner door panel 14 extend into the openings 42,44, as seen in FIG. 1. The engagement by the hooks 16,18 secure the molded door trim panel 12 to the inner door panel 14 and restrict movement of the upper portion 22 and the lower portion 24 of the molded door trim panel 12 in the lateral direction.

The locator pin 20 is substantially cylindrical and is comprised of a main body 46 and a free end 48, wherein the free end 48 is integral with and extending from the main body 46. The free end 48 is substantially cylindrical and is slightly smaller in diameter than the locating aperture 32 in the inner door panel 14. The main body 46 of the locator pin 20 is larger in diameter than both the locating aperture 32 and the free end 48. A shoulder 50 is provided on the main body 46 that extends substantially perpendicular from the periphery 52 of the main body 46 to the periphery 54 of the free end 48. The free end 48 of the locator pin 20 extends through the locating aperture 32 of the inner door panel 14 to locate and restrict movement of the molded door trim panel 12 in the vertical and fore and aft directions, and the shoulder 50 of the main body 46 abuts and engages the inner door panel 14 to locate and restrict movement of the molded door trim panel 12 in the lateral direction.

The molded door trim panel 12 is composed of a flexible plastic that has the ability to flex in the lateral direction. The locator pin 20 is long enough so that the center portion 26 of the molded door trim panel 12 flexes away from the inner door panel 14 when the locator pin 20 is engaged with the inner door panel 14. The flexing of the molded door trim panel 12 biases the molded door trim panel 12 toward its natural free state position and forces the shoulder 50 of the locator pin 20 to maintain engagement against the inner door panel 14. The biasing of the molded door trim panel 12 toward its natural free state position also maintains the extension of the free end 48 of the locator pin 20 through the locating aperture 32 of the inner door panel 14.

Figure 2:
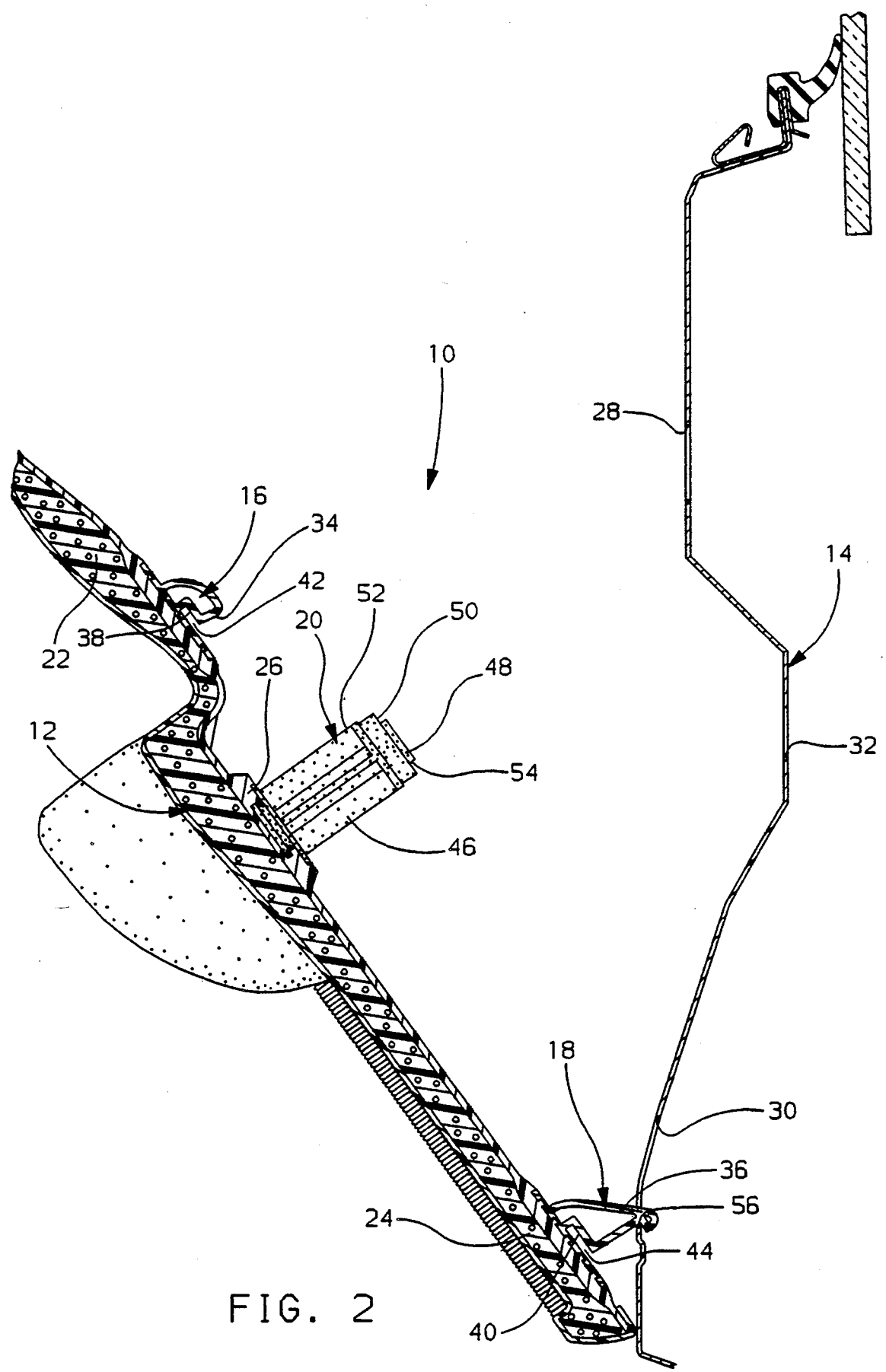
FIG. 2 is a side elevation view showing the molded door trim panel in a first position for assembly, wherein the molded door trim panel is cantilevered at an acute angle relative to the inner door panel.

When assembling the molded door trim panel 12 to the inner door panel 14, the hook 18 in the lower portion 24 of the molded door trim panel 12 is inserted through its corresponding aperture 30 in the inner door panel 14. As seen in FIG. 2, the downwardly angled finger 36 overlies an edge 56 of the inner door panel 14 that defines the lower aperture 30, while the lower portion 24 of the molded door trim panel 12 contacts the inner door panel 14 so that the molded door trim panel 12 is cantilevered at an acute angle relative to the inner door panel 14. The cantilevered molded door trim panel 12 provides a first assembly position wherein an assembler (not shown) can complete miscellaneous assembling of the molded door trim panel 12.

A second assembly position, as seen in FIG. 3, is established by having the molded door trim panel 12 pivot towards the inner door panel 14 until both hooks 16,18 are extending through the uppermost and middlemost portions, respectively, of the corresponding apertures 28,30 in the inner door panel 14. The free end 48 of the locator pin 20 abuts the inner door panel 14 and does not extend through the locating aperture 32 in the inner door panel 14, thus causing the center portion 26 of the molded door trim panel 12 to flex away from the inner door panel 14 and bias toward the molded door trim panel's natural free state position. The corresponding apertures 28,30 in the inner door panel 14 are large enough so that the hooks 16,18 can travel in a limited range in the vertical and fore and aft directions. The molded door trim panel 12 assumes a vertically upward position by having the hooks 16,18 occupy the uppermost and middlemost portions of the corresponding apertures 28,30.

The molded door trim panel 12 is moved in the vertically downward and fore and aft direction until the free end 48 of the locator pin 20 is biased by the molded door trim panel 12 to extend through the locating aperture 32. The shoulder 50 of the locator pin 20 is also biased towards the inner door panel 14 and engages the inner door panel 14 to provide a lower position, as seen in FIG. 1. Once the free end 48 of the locator pin 20 extends through the locating aperture 32, the molded door trim panel 12 is located and restricted from moving in the vertical and fore and aft directions. The engagement of the shoulder 50 against the inner door panel 14 locates and restricts movement of the molded door trim panel 12 in the lateral direction.

Thus, it is seen that the invention provides a new and improved hook and pin fastener assembly 10 that both connects and reliably locates the molded door trim panel 12 to the inner trim panel 14 without the use or need of conventional fasteners.

The embodiments of the invention in which an exclusive property or privilege is claimed are defined as follows:

1. A hook and pin fastener assembly for connecting and reliably locating a trim panel to an apertured body panel of a motor vehicle without the use of fasteners comprising:

a plurality of hooks connected to said trim panel to slidably retain said trim panel to said body panel and restrict movement of said trim panel in the lateral direction; and means for locating and restricting movement of said trim panel in the lateral, vertical, and fore and aft directions without the use of fasteners.

2. A hook fastener assembly for connecting and reliably locating a flexible trim panel to an apertured body panel of a motor vehicle without the use of fasteners comprising:

a plurality of hooks connected to said trim panel to slidably retain said trim panel to said body panel and restrict movement of said trim panel in the lateral direction;

said body panel having a locating aperture that is utilized as a reference for locating said flexible trim panel to said body panel;

a locator pin connected to said trim panel and having a main body larger than said locating aperture and a free end slightly smaller than said locating aperture;

said free end of said locator pin extending through said locating aperture in said body panel to locate and restrict movement of said trim panel in the vertical and fore and aft directions; and said main body of said locator pin engaging said body panel so that said trim panel flexes laterally away from said body panel and is biased toward its natural free state position so that said main body maintains engagement with said body panel to locate and restrict movement of said trim panel in the lateral directions.

3. A hook fastener assembly for connecting and locating a flexible molded door trim panel to an apertured inner door panel of a motor vehicle without the use of fasteners comprising:

said molded door trim panel having an upper portion, a lower portion and a center portion;

a pair of hooks having one of said hooks molded to said upper portion of said molded door trim panel and the other of said hooks molded to said lower portion of said molded door trim panel, and said pair of hooks extending through said apertures of said inner door panel to slidably retain said molded door trim panel to said inner door panel and restrict movement of said upper portion and said lower portion of said molded door trim panel in the lateral direction;

said inner door panel having a substantially circular locating aperture that is utilized as a reference for locating said flexible trim panel to said inner door panel;

a substantially cylindrical locator pin molded to said center portion of said molded door trim panel and having a main body larger than said locating aperture and a free end slightly smaller than said locating aperture;

said free end of said locator pin integral with and extending from said main body of said locator pin, and said free end extending through said locating aperture of said inner door panel to locate and restrict movement of said molded door trim panel in the vertical and fore and aft directions; and said main body of said locator pin having a shoulder that engages said inner door panel, and said main body interposing between said molded door trim panel and said inner door panel to flex said molded door trim panel laterally away from said inner door panel thus biasing said molded door trim panel toward its natural free state position so that said shoulder of said locator pin maintains engagement with said inner door panel to locate and restrict movement of said molded door trim panel in the lateral directions.

* * * * *